US011475397B2

(12) United States Patent
Burris et al.

(10) Patent No.: US 11,475,397 B2
(45) Date of Patent: Oct. 18, 2022

(54) ITEM RETURN ARCHITECTURE AND PROCESSING

(71) Applicant: NCR Corporation, Atlanta, GA (US)

(72) Inventors: Matthew Robert Burris, Atlanta, GA (US); Christopher John Costello, Suwanee, GA (US); Caleb Wayne Martinez, Fayetteville, GA (US); Jodessiah Sumpter, Alpharetta, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 17/151,914

(22) Filed: Jan. 19, 2021

(65) Prior Publication Data

US 2022/0230135 A1 Jul. 21, 2022

(51) Int. Cl.
*G06Q 10/08* (2012.01)
*G06Q 10/06* (2012.01)

(52) U.S. Cl.
CPC ..... *G06Q 10/0837* (2013.01); *G06Q 10/0633* (2013.01); *G06Q 10/087* (2013.01)

(58) Field of Classification Search
CPC .. G06Q 10/0837; G06Q 10/087; G06Q 20/32; G06Q 30/0641
USPC ........................................................ 705/340
See application file for complete search history.

(56) References Cited

U.S. PATENT DOCUMENTS

| 7,455,226 | B1* | 11/2008 | Hammond | G06Q 20/202 |
| | | | | 705/28 |
| 11,188,970 | B1* | 11/2021 | Xu | G06Q 10/0834 |
| 2017/0364860 | A1* | 12/2017 | Wilkinson | G06Q 30/0255 |
| 2019/0244214 | A1* | 8/2019 | Flores | G06Q 30/016 |
| 2020/0065791 | A1* | 2/2020 | Patil | G07G 1/0063 |
| 2021/0022536 | A1* | 1/2021 | Anderson | G06Q 10/0832 |
| 2021/0136543 | A1* | 5/2021 | Hannestad | H04W 4/023 |
| 2021/0240152 | A1* | 8/2021 | Kottur | H04W 4/021 |
| 2021/0309212 | A1* | 10/2021 | Sonalker | H04W 4/021 |
| 2021/0359996 | A1* | 11/2021 | Brown | G06V 20/20 |

OTHER PUBLICATIONS

Return Fraud and Abuse: How to Protect Profits Published by Center for Retailing Studies Retailing Issues Letter (Year: 2005).*

* cited by examiner

*Primary Examiner* — Zeina Elchanti
(74) *Attorney, Agent, or Firm* — Schwegman, Lundberg & Woessner

(57) ABSTRACT

An item return for an item is identified and a workflow is determined based on first factors defined in customized rules. Resources associated with the workflow may be staged on devices associated with the item return and the workflow is initiated. When the item is detected as being present at a drop-off location for the item, item and customer information are gathered in accordance with the customized rules associated with the workflow. Security checks are processed using second factors defined in the customized rules. A decision is made based on the security checks as to whether the item return can continue processing with the workflow or as to whether an item return exception is to be raised for evaluation and/or inspection of the item and item return information collected before the item return exception was raised.

13 Claims, 4 Drawing Sheets

ITEM RETURN ARCHITECTURE AND PROCESSING

BACKGROUND

Retailers struggle managing the returns process in their stores. Key challenges include staffing the customer returns desk to ensure a good customer experience; providing a favorable customer experience during returns since it is one of the longest and most important interactions between stores and their customers with a major impact on brand loyalty; handling the disposition of the returned item; and limiting retail fraud (which is substantial with returned items).

Furthermore, item return procedures are typically the same for any returned item regardless as to whether some items are more likely to being associated with fraudulent returns than other items and regardless as to whether an expense associated with the staff processing a particular item return is greater than just accepting the corresponding item with or without a modified returns procedure by the retailer.

In fact, hassling a customer over an item priced at only a few dollars in order to follow the existing returns process when the customer is a loyal customer can be very detrimental to the reputation of the retailer. Staff time in processing the return can cost the retailer more than just simply accepting the return with little to no questions asked. However, staff often lack any authority to override the existing process, which usually requires a manager's approval. Long customer queues are not uncommon at returns desks, which can require additional staff to address and which does frustrate the retailer's customers.

There is no existing technology available in the industry that addresses these challenges even though item returns consume a substantial amount of a retailer's resources and even though item returns are associated with significant retail fraud.

SUMMARY

In various embodiments, methods for processing and a system for processing an item return architecture are presented.

According to an embodiment, a method for processing an item return within an item return architecture is presented. A workflow for an item return of an item is determined based on first factors and the workflow is processed. During processing of the workflow: 1) a presence of the item is detected at a drop-off location for the item return; 2) return information is collected for the item; 3) a security check is performed based on second factors using at least a portion of the return information; and 4) an item return exception is raised causing an interruption in the workflow based on performance of the security check.

DETAILED DESCRIPTION

Figure 1A:
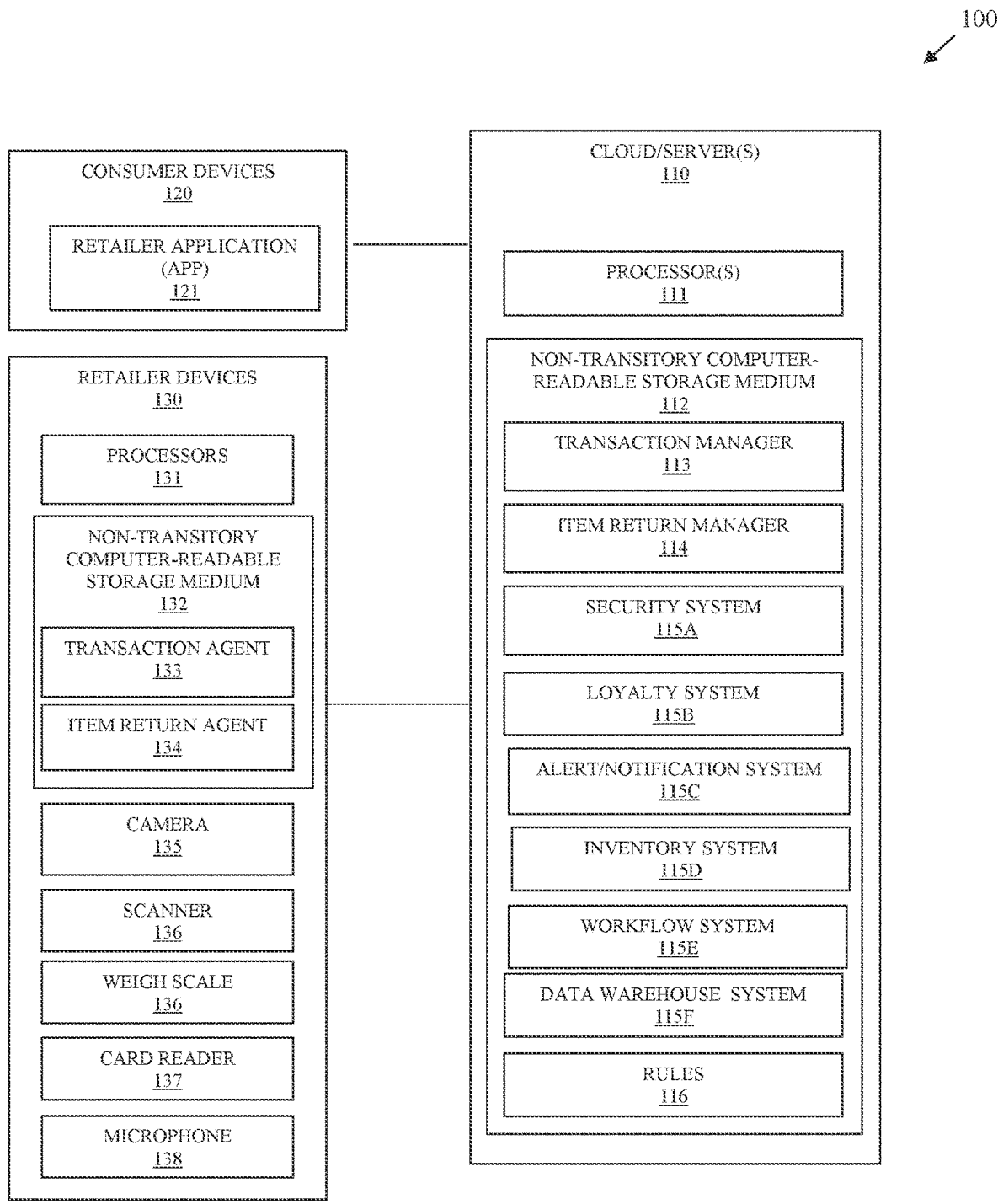
FIG. 1A is a diagram of an item return architecture, according to an example embodiment.

FIG. 1A is a diagram of an item return architecture 100, according to an example embodiment. It is to be noted that the components are shown schematically in greatly simplified form, with only those components relevant to understanding of the embodiments being illustrated.

Furthermore, the various components (that are identified in architecture 100) are illustrated and the arrangement of the components are presented for purposes of illustration only. It is to be noted that other arrangements with more or less components are possible without departing from the teachings of processing item returns within item return architecture 100, presented herein and below.

Architecture 100 provides a comprehensive item returns platform that is fully customizable based on any given retailer's return policies and procedures and that is capable of being integrated and processed by existing retailer endpoint devices. An item return is pre-staged through a variety of devices, which can be handled by the customer or by retail staff. Upon item arrival a given retailer's endpoint devices are custom configured based on a variety of factors driven by existing data of the retailer. An item return transaction is initiated, and a variety of custom retailer rules are processed. Some processed rules include fraud security checks that may utilize existing endpoint device peripherals, such as cameras for computer-vision item identification, weigh scales for item weight determination, etc. Once verified, credit/payment processing initiates, retailer inventory data updates, and/or customer-driven offers may be provided to the customer. Architecture 100 provides a complete 360-degree approach to an item return process that is data driven and customized for any given retailer.

As used herein and below, the term "operator" refers to a customer or retail staff interacting with interfaces of a device. A "device" refers to any device processing the interfaces for which an operator interacts with during an item return.

The terms "staff," "staff member," "user," "customer," "consumer," "personnel," "actor," "person," "individual," and "clerk" may be used interchangeably and synonymously with the term "operator."

An "endpoint device" refers to a retailer device, which may be operated by retail staff during a customer-assisted item return or which may be operated by a customer during a self-item return performed by the customer without any retailer assistance. Endpoint devices include Self-Service Terminals (SSTs), Point-Of-Sale (POS) terminals, and staff-operated mobile devices.

A "mobile device" may be operated by a customer (such as through a customer's phone, tablet, laptop, or wearable processing device) or may be operated by retail staff (such as through a staff phone, staff tablet, staff laptop or staff wearable processing device).

A "consumer device" can include a mobile device of the customer, an SST of the retailer, or a customer desktop computer.

A "retailer device" can be operated by either a customer or retail staff and may include a mobile device or an endpoint device as described above.

A "rule" is comprised of statements that include one or more conditions, operands, and actions evaluated during during execution of software that processes the rule. Each condition is expressed in each statement with one or more operands; an operand can be a hard-coded constant or a variable, which is resolved during execution of the software.

Rules can be customized as text for item return procedures, item return workflow, and/or policies of any given retailer. The procedures and policies can be defined within the text statements of the rules of the conditions, operands, and actions, which when evaluated during an item return provides real-time fraud/security compliance, exception processing, notification/alert processing, offer (Customer-Relationship Management (CRM)) processing, and/or Application Programming Interface (API) calls for initiating or interacting with automated programs (such as by way of example only a retailer's loyalty system, a retailer's inventory management system, a retailer's security system, a retailer's transaction system, a retailer's workflow management system, a retailer's data warehouse system, etc.).

Architecture/Platform 100 comprises one or more cloud/servers 110, consumer devices 120, and retailer devices 130. Server 110 comprises at least one processor 111 and a non-transitory computer-readable storage medium 112. Medium 112 comprises rules 116 and executable instructions for transaction manager 112, item return manager 114, security system 115A, loyalty system 115B, alert/notification system 115C, workflow system 115D, inventory system 115E, and data warehouse system 115F. The executable instructions when provided to processor 111 cause processor 111 to perform the processing described herein and below with respect to 113-114 and 115A-115F.

Each consumer device 120 comprises a processor and non-transitory computer-readable storage medium having executable instructions for a retailer application 121. Retailer application 121 may be a mobile application (app) or may be a browser-based interface comprising browser pages rendered to and executed on device 120.

Each retailer device 130 comprises at least one processor 131 and a non-transitory computer-readable storage medium 132. Medium 132 comprises executable instructions for transaction agent 133 and item return agent 134. The executable instructions when provided to processor 131 cause processor 131 to perform the processing described herein and below with respect to 133-134.

Optionally, each or some of retailer devices 130 may include integrated peripheral devices, such as camera 135, scanner 136, weigh scale 136, payment/gift/loyalty card reader 137, and microphone 138.

In some embodiments, camera 135 and microphone 138 may be separate stand-alone network appliances that provide images and audio from objects and persons during item returns at a given retailer device 130. So, cameras 135 and microphones 138 need not be integrated into any given retailer device 130. But there may be a plurality of different types of retailer devices 130, such that some devices 130 include integrated cameras 135 and microphones 138 while other devices 130 lack 135 and 138 and are optionally being monitored by a network-based cameras 130 and/or microphones 138.

Returned items can be processed in a variety of different workflows, such that as described below there may several alternatives or processing paths depending on initial or preceding actions processed within the workflows. A comprehensive process flow and concomitant workflows are illustrated and discussed below with reference to FIG. 1B.

Initially, if pre-staging of the item return is being initiated by the customer, retailer app 121 may be used for prestaging the item for a return utilizing a user-facing interface of app 121. The customer enters into the user-facing interface of app 121 a variety of item return details (product name, date purchased, store purchased, item price, etc.), personal information of the customer, and loyalty information (assuming the customer has a loyalty account with the retailer).

User-facing interface of app 121 guides the customer through a variety of rendered interface screens rendered on a display of device 120 allowing the customer to select option associated with a desired store to drop the item off, drop-off location, etc. The app responds through the user-facing interface with a return confirmation number and customer instructions to complete the item return with the customer-selected options.

App 121 interacts with item return manager 114 during any customer-initiated pre-staging and supplies the options and instructions via the user-facing interface of app 121.

During the pre-staging item return manager 114 determines the item type (e.g., electronics, clothing, houseware, etc.), item category (e.g. electronic gaming device, men's jeans, dishes, etc.), and item brand (e.g. Microsoft®, Kohls®, Pampered Chef®, etc.) for a distributor or manufacturer of the item. The customized rules 116 are processed for the given retailer associated with the item return and any resources that are going to be needed at the drop off store are provisioned and/or configured on devices 130 so that devices 130 have the necessary resources for continued processing of the retailer's item return associated with the item type, item category, and/or item brand. The resources can include specific anti-fraud rules 116, computer vision applications and any security rules 116, loyalty rules 116 for marketing or offers specific to the customer, etc. That is, the endpoint devices 130 are provisioned with any applications and rules that are going to be needed in the item return workflow for handling the item return before the customer drops off the item at the drop-off store.

App 121 may also be equipped with utilizing location services of device 120 or through wireless beacon signal recognition in order to provide an automated notice to item manager 114 when the customer has entered a predefined geofenced area associated with the drop-off store. This can be done in a variety of ways. For example, the app 121 reporting the device's current geographical location to item return manager or app 121 detecting a beacon signal from the drop-off store's wireless beacon and app 121 in response to the signal detection sending a message of the customer's arrival within the geofenced area to item return manager 114. It is noted that other location based geofenced tracking techniques may be used as well for purposes of alerting item return manager 114 of the customer's arrival at the drop-off store.

Item return manager 114 responds to the notice of the customer's arrival within the geofenced area of the drop-off store with a push notification to the customer on device 120. The push notification can be an in-app message sent to app 121 or can be a text message sent to device 120. The push notification includes specific in-store instructions on what is expected of the customer for the item return workflow to complete the item return at the drop-off store.

The in-store instructions may include a variety of options that the customer can chose to complete the return with the retailer, such as through an endpoint device 130 (e.g., SST) of the retailer without any assistance of in-store staff (note that an endpoint device 130 associated with this option can also be a mobile store-provided device that customers typically use to self-shop within the store as well), self-completing the return through device 120 using app 121 without any assistance of staff, through interaction with a staff member of the store who is operating a specific retailer device 130 (e.g. POS terminal), or through interaction with a staff member who is operating a mobile retailer device 130.

The options presented to the customer through the push notification are driven by the retailer's item return rules processed by item return manager and may be dependent on the item type, item category, item brand, and/or a customer identifier associated with the customer. In some cases, the only option provided may be through staff at a POS terminal 130 within the store when the rules indicated that the item is a high-value item and/or when the rules indicated that customer history data or loyalty data associated with the customer indicates the customer frequently returns items, or is associated with a known previous fraudulent return.

When the customer selected an option to complete the return at an SST 130 (can also be a mobile store-provided shopping device) within the store, the SST/mobile device 130 was already pre-provisioned with the appropriate resources to guide the customer through the interface screens by transaction agent 133 and item return agent 134.

When the customer selected an option to complete a self-directed item return, app 121 was already pre-provisioned with the appropriate resources to guide the customer through the user-facing interface screens rendered on a display of device 120 for customer interaction.

When the customer selected an assistance-based option to complete the return at a POS terminal 130 (can also be a staff-operated mobile device), POS Terminal/staff-operated mobile device was already pre-provisioned with the appropriate resources to guide the staff member through interface screens by transaction agent 133 and item return agent 134.

The item return rules processed by the endpoint device (130 or 120 in the case where the customer is using app 121) may include collecting a variety of information about the item being returned and the customer, such as an image of the transaction receipt for the item return using camera 135, scanner 136, or an integrated camera of device 120, item catalogue data through interaction with data warehouse system 115F, customer identifier and authentication through interaction with loyalty system 115B and/or security system 115A. Again, the amount of required data regarding the item return and the customer is driven by the customized rules and the rules can be dependent on a variety of factors, such as item type, item category, item brand, and/or customer transaction history or loyalty history.

In cases where additional security is warranted when processing the item return rules, a variety of security processing can be performed and driven by item return manager 114.

For example, a fraud score can be calculated in real-time and provided by security system 115A to item return manager 114. The factors used to calculate a current fraud score by security system 115A can include one or more of the following: 1) a likelihood of fraud or calculated weight based on metrics gathered from transaction histories of all customers with respect the item across all geographical store locations of the retailer, with respect to the drop-off store, with respect to a geographical area of the drop-off store; 2) a likelihood or calculated weight of fraud based on metrics gathered from a transaction history of the customer; 3) a likelihood of fraud or calculated weight based on time of day, day of week, and calendar date of the item return based on transaction histories of all stores, stores in the geographical location of the drop-off store, or the drop-off store; 4) a likelihood of fraud or calculated weight based on the drop-off store's transaction history for its customers having the staff that is on duty at the store at the time of the item return; 5) a likelihood or calculated weight based on a current traffic load at the drop-off store as determined from current transaction receipts within a pre-defined time range of the time associated with the item return; and/or 6) a likelihood of calculated weight based on the metrics associated with an item price history for the item in view of the purported item return price with the item return.

Item return manager 114 may also engage computer vision utilizing camera 135 and/or an integrated camera of device 120 for purposes of analyzing images taken of the item and comparing the images against a model image maintained for the item. Computer vision applications may do this analysis and provide item return manager with a damaged or counterfeit score. This may reveal to item return manager 114 that the item is badly damaged or that the item is really not what it was purported to be by the customer or the staff member when the item return was initialized and item information was collected from the customer or the staff member.

Item return manager 114 aggregates and compares the scores (fraud score, damaged score, and counterfeit score) against one or more thresholds or ranges of scores and based on the item return rules makes a decision as to whether the item return and continue or whether the item return requires review by a store manager before it is permitted to proceed. The manner in which the scores are aggregated and compared with the thresholds or ranges can be defined within the item return rules 116 or provided by security system 115A through resolved fraud profiles maintained by security system 115A.

When item return manager 114 determines that the item return cannot proceed without manager assistance, an item return exception is raised and sent via an API call to alert/notification system 115C. Alert/Notification system 115C then sends a message to a device associated with the drop-off store manager that is on duty at the time of the return (or any other staff member authorized to handle the item return exception).

Assuming the item return is accepted by item return manager 114 to proceed after the fraud analysis, loyalty system 115B is engaged by item return manager through an API call along with a customer identifier (assuming one was available with the item return in which case a customer name is provided) for the customer and the item return details. Loyalty system 115B determines whether the customer has an account or not with the retailer, and if not, loyalty system may process marketing rules associated with onboarding the customer with the retailer and notifies item return manager 114. Item return manager may deliver onboarding interface screens for rendering on device 130 or device 120 to the customer. The onboarding interface screens may include an offer to entice the customer to register with the retailer. Loyalty system 115B may also process marking rules that are specific to a customer's loyalty level, the customer's assigned customer segment with the retailer, and/or the customer's known transaction history for purposes of sending an offer or an upsell enticement back to item return manager for rendering on device 130 or 120 to the customer.

When the item return was authorized by item return manager 114 and/or by manager override after manual inspection of the item return, item return manager processes refund rules 116 for crediting or refunding the customer for the returned item. The rules 116 can be specific to the customer, to the store, and/or to a governmental jurisdiction associated with the store. So, the customer may receive an in-store credit, a refund to a payment card inserted into card reader 137 or associated with the original item purchase transaction; the customer may be issued an electronic voucher provided through app 121; or the customer may be instructed to proceed to a POS terminal 130 to receive a full cash refund (a code may be sent to app 121 that when scanned by a staff member at the POS terminal 130 opens a cash drawer for the staff member to provide the cash to the customer. In fact, the refund rules 116 can provide a variety of manners in which the customer can obtain the refund beyond what was stated above, for instance A SST 130 may dispense the cash directly to the customer at the SST 130 via a cash dispenser and/or coin dispenser (existing SSTs are equipped with such dispensers to dispense cash and coins for a transaction when the customer pays with cash, such that item return agent and transaction agent can activate the terminal depository and provide direct cash to the customer). In some cases, the SST 130 may be equipped to dispense cryptocurrency from a wallet of the retailer to a wallet of the customer. Again, other mechanisms may be used as well.

The staff members that handle the returned item may also be notified of the returned item's location and store instructions as to how the item is to be handled (e.g., donated to a charity, restocked on shelves of the store, discarded, processed for a manufacturer return, etc.). Assuming the item is to be restocked and resold, item return manager 113 sends an API call to inventory system 115D instructing the inventory system 115D of the addition of the item for inventory management and maybe a current location of the returned item within the store along with a date and time.

A historical log of the item return and data associated with the item return is also maintained and sent to an auditing system (not shown in FIG. 1A). The log may be programmatically mined for purposes of automated adjustment of the item return rules 116. Furthermore, periodically known fraudulent transactions can be ascertained from transaction histories or fraud histories and processed for automated adjustment of the item return rules 116. This improves fraud detection and continuously evolves and learns new item return frauds being perpetrated against the store and retailer. In an embodiment, one or more trained machine-learning algorithms are used to automatically mine transaction histories and fraud histories for programmatic and automated adjustment of the item return rules 116, the fraud rules 116, and the damaged or counterfeit rules 116 associated with item returns.

In an embodiment, the rules 116 are packaged together in groups as workflows maintained by workflow system 115E and provided as needed to item return manager 114. So, sets of rules 116 are defined within process flows and sub-process flows within the workflows. As rules 116 are evaluated in real time, other sub workflows are provided to item return manager 114 for evaluation. Furthermore, and as discussed above, item return manager 114 may pre-provision app 121, transaction agent 133, and item return agent 134 with needed workflows and their corresponding rules based on any pre-staged item return. This improves the processing responsiveness of architecture/platform 100 by having the necessary resources in advance of an in-store provided returned item.

In an embodiment where the customer performs a self-return (self-initiated return at the store with the item in hand), the instructions provided to the customer may indicate that the customer is to drop or place the item in a designated bin within the store. The bin may be a secure bin that includes a hinged door that only permits items to be put into but not taken out of the bin by the customer; in some cases, the hinged door may only unlock to allow the customer to deposit the item when receiving an unlock command sent from item return agent 134 or app 121 to a smart lock. In an embodiment, the secure bin is adjacent to or attached to an SST 130 used by the customer during the item return. Furthermore, camera views directed to the bin or the designated drop-off shelf/drop-off area/drop-off desk may capture images of both the item and the customer during drop off for visual audit of the customer relinquishing possession and control of the returned item and placing the item in the possession and control of the retailer.

In an embodiment, item return manager 114 may also generate and provide an item return receipt, which can be printed from a receipt printer of retailer device 130 and/or which can be sent to app 121 as a link or an image. The receipt may also be sent to the customer via text message and/or email. The manner in which the receipt is provided (e.g., printed, emailed, text, in-app image) can be selected by the customer through user-interface screens upon completion of the item return or can be automatically determined based on a registered customer profile of the customer obtained by item return manager 114 from loyalty system 115B.

In an embodiment, item manager 114 may also interact with inventory system 115D during item return pre-staging to verify a current level of inventory for the item. This may be useful when the store never possessed any inventory for the item being returned or when the inventory indicates that the none of items have been sold by the store according to the inventory system 115D (which may be an indication of theft or which may indicate that the customer never purchased the item being returned by the customer from the store). These anomalies may be defined in the item return rules to cause item return manager 114 to either reject the pre-staging of the item return or obtain a different set of rules 116 for how the item returned will be handled once the customer arrives at the store with the item in hand to initiate the item return.

In an embodiment, pre-staging is not performed for the return item, such that the first step in a given return workflow is return initialization or item return initialization. In this embodiment, the item return manager 114 may also interact through API calls with inventory system 115D to validate that it is even possible that the item being returned is an item sold by the store.

Figure 1B:
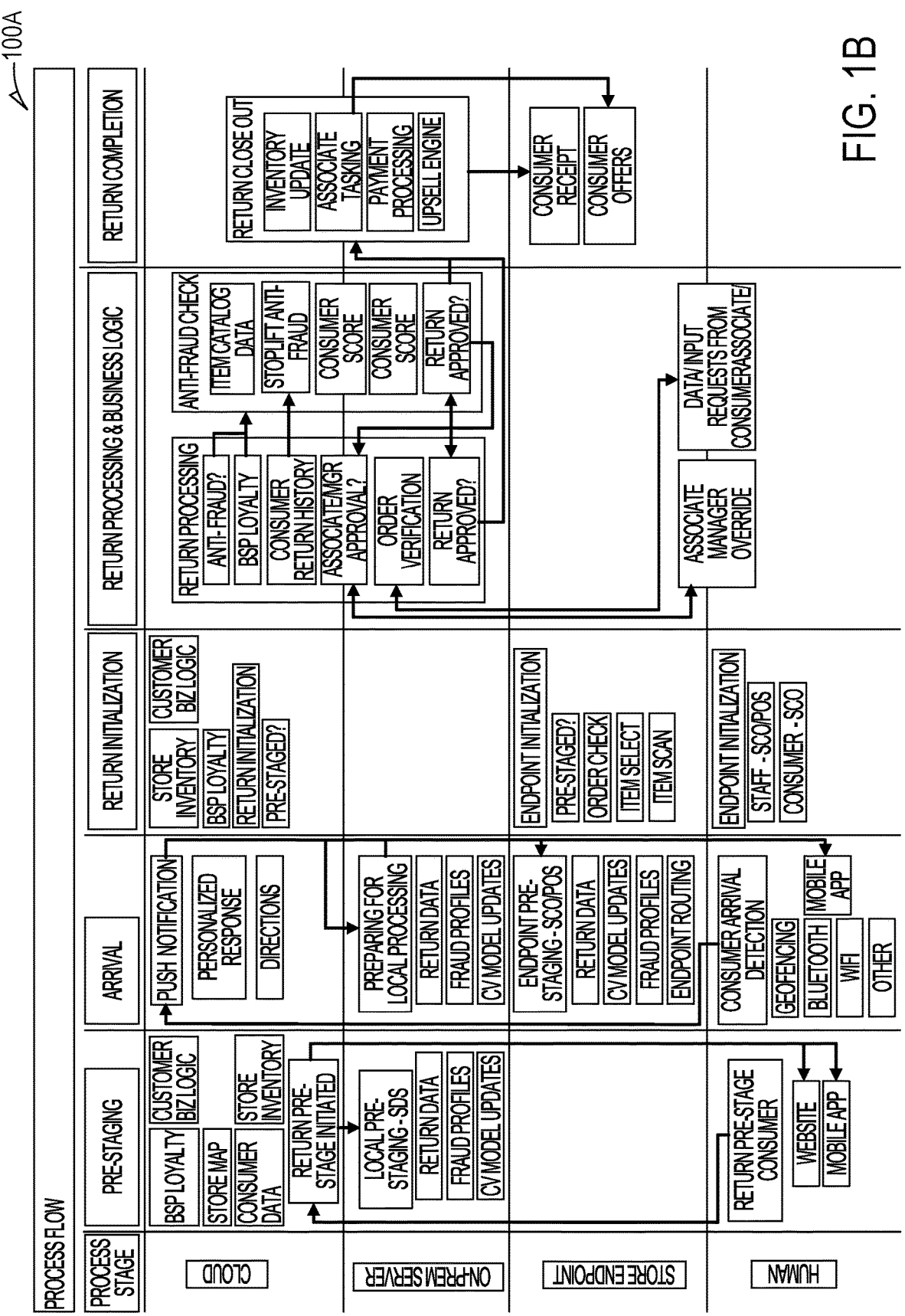
FIG. 1B is a diagram of a process flow for processing item returns within the item return architecture of FIG. 1A, according to an example embodiment.

FIG. 1B is a diagram of a process flow 100A for processing item returns within the item return architecture of FIG. 1A, according to an example embodiment.

Process flow 100A illustrates each of the potential workflows and sub-workflows from pre-staging (assuming pre-staging was used) and completion of the item return (customer refund and store in possession of the item returned).

There are 5 major sub-workflows (shown as the column headers in FIG. 1B) associated with a pre-staging sub-workflow, a customer arrival at the drop-off store sub-workflow, item in hand for item return initiation at the store sub-workflow, in-store customized item return sub-workflow, and an item return completion sub-workflow.

The rows (left-hand side of FIG. 1B) illustrates resources that may handle or may process portions of the sub-workflows. The cloud row indicates processing performed on cloud/server 110, the on-premises row indicates processing performed either on cloud/server 110 or device 130, the store endpoint indicates processing performed on either device 120 or 130, the human row indicates processing performed on device 120 or 130 through interfaces operated by the customer or staff members of the retailer. The processing utilizes app 121, transaction agent 133, item return agent 134, transaction manager 113, item return manager 114 security system 115A, loyalty system 115B, alert/notification system 115C, inventory system 115D, workflow system 115E, data warehouse system 115F, and rules 116 as discussed above with FIG. 1A.

The above-noted embodiments and other embodiments are now discussed with reference to FIGS. 2-4.

Figure 2:
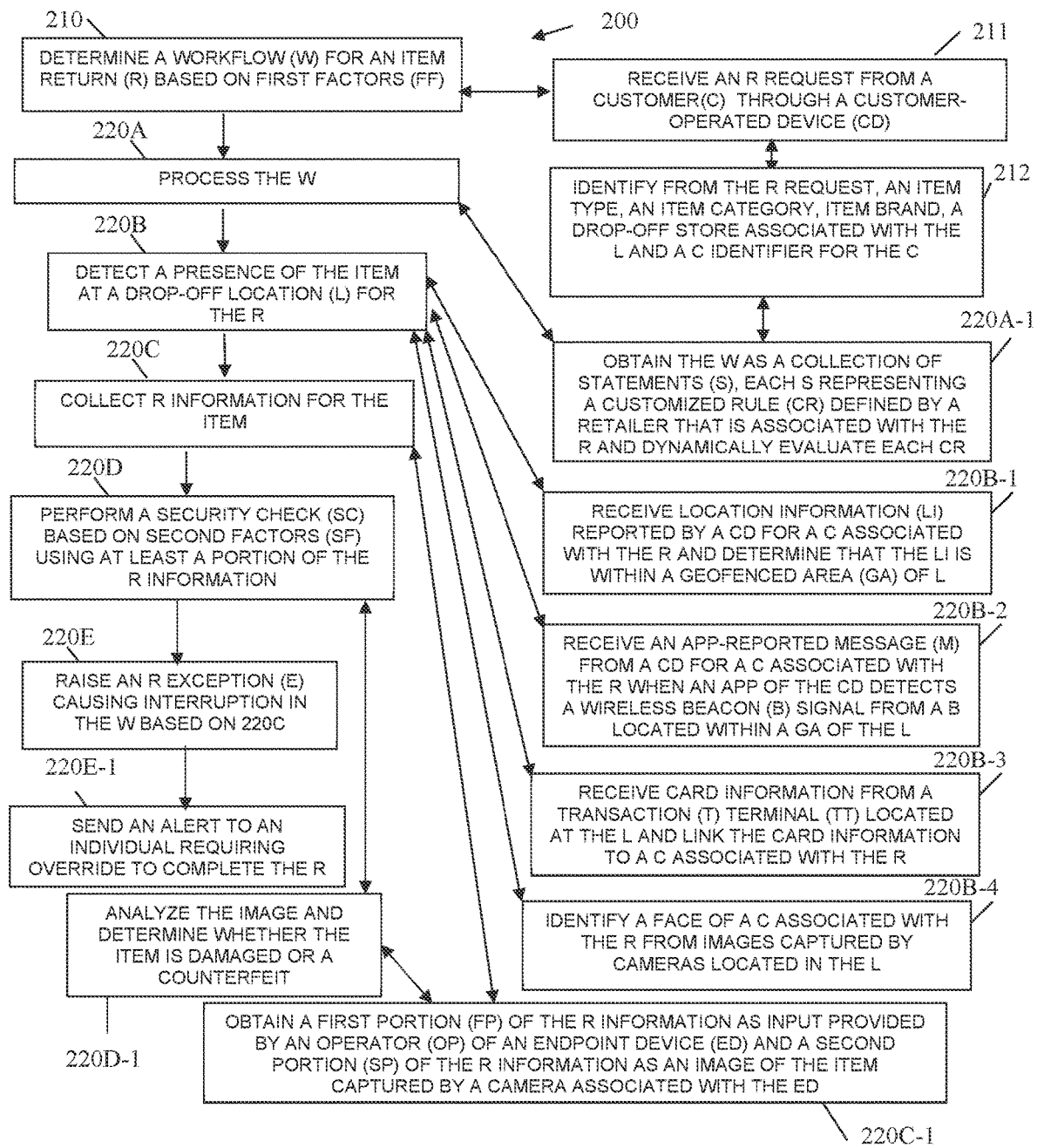
FIG. 2 is a diagram of a method for processing an item return within an item return architecture, according to an example embodiment.

FIG. 2 is a diagram of a method 200 for processing an item return within an item return architecture, according to an example embodiment. The software module(s) that implements the method 200 is referred to as an "item return fraud manager." The item return fraud manager is implemented as executable instructions programmed and residing within memory and/or a non-transitory computer-readable (processor-readable) storage medium and executed by one or more processors of one or more devices. The processor(s) of the device that executes the item return fraud manager are specifically configured and programmed to process the item return manager. The item return fraud manager may have access to one or more network connections during its processing. The network connections can be wired, wireless, or a combination of wired and wireless.

In an embodiment, the device that executes the item return fraud manager is server 110. In an embodiment, server 110 is a cloud-based server comprised of a plurality of servers logically cooperating and accessible as a single server 110, a local-area network (LAN)-based server, or a wide-area network (WAN) server.

In an embodiment, multiple devices execute different portions of item return fraud manager. For example, some portions of the item return fraud manager execute on a cloud 110 while other portions of the item return fraud manager execute on one or more WAN or LAN servers 110. As another example, some portions of item return fraud manager execute on retailer devices 130, others on consumer devices 120, while still others on cloud 110 and/or server 110.

In an embodiment, the item return fraud manager is all or some combination of 113-114, 121, and/or 133-134.

At 210, the item return fraud manager determines a workflow (process flow) for an item return based on first factors.

In an embodiment, at 211, the item return fraud manager receives an item return request from a customer through a customer-operated device that executes retailer app 121 (mobile-app based, or browser based on the customer-operated device).

In an embodiment of 211 and at 212, the item return fraud manager identifies from the item return request an item type for the item that is being returned, an item category for the item within the item type, an item brand for the item within the item category, and a drop-off store associated with a drop-off location, and a customer identifier for the customer. The workflow is determined based on this information, and the workflow is customized for a retailer associated with the drop-off-store.

At 220A, the item return fraud manager processes the workflow.

In an embodiment of 220A and 212, at 220A-1, the item return fraud manager obtains the workflow as a collection of statements. Each statement representing a customized rule defined by a retailer associated with the item return and the item return fraud manager dynamically evaluates each customized rule while processing the workflow.

At 220B, the item return fraud manager detects a presence of the item at a drop-off location for the item return.

In an embodiment, at 220B-1, the item return fraud manager receives location information reported by a customer device 120 for a customer associated with the item return and the item return fraud manager determines that the location information is within a geofenced area of the drop-off location.

In an embodiment, at 220B-2, the item return fraud manager receives an app-reported message from a customer device 120 for a customer associated with the item return when an app 121 of the customer device 120 detects a wireless beacon signal from a wireless beacon located within a geofenced area of the drop-off location.

In an embodiment, at 220B-3, the item return fraud manager receives card information from a transaction terminal 130 located at the drop-off location and links the card information to a customer associated with the item return.

In an embodiment, at 220B-4, the item return fraud manager identifies a face of a customer associated with the item return from images captured by cameras located in the drop-off location.

At 220C, the item return fraud manager collects return information for the item.

In an embodiment, at 220C-1, the item return fraud manager obtains a first portion of the return information as input provided by an operator of an endpoint device (120 or 130) and a second potion of the return information as an image of the item captured by a camera associated with the endpoint device (120 or 130).

At 220D, the item return fraud manager performs a security check based on second factors using at least a portion of the return information.

In an embodiment of 220D and 220C-1, at 2200-1, the item return fraud manager analyzes the image and determines whether the item is damaged or a counterfeit.

In an embodiment, the security check may additionally entail checking inventory records for the item at the store associated with the drop-off location to determine whether the item was ever in inventor or was never sold by the store, such that there can be no item return.

At 220E, the item return fraud manager raises an item return exception causing interruption in the workflow based on the security check performed at 220D.

In an embodiment, at 220E-1, the item return fraud manager sends an alert to an authorized individual such that an override is required to complete the return and complete processing of the workflow.

Figure 3:
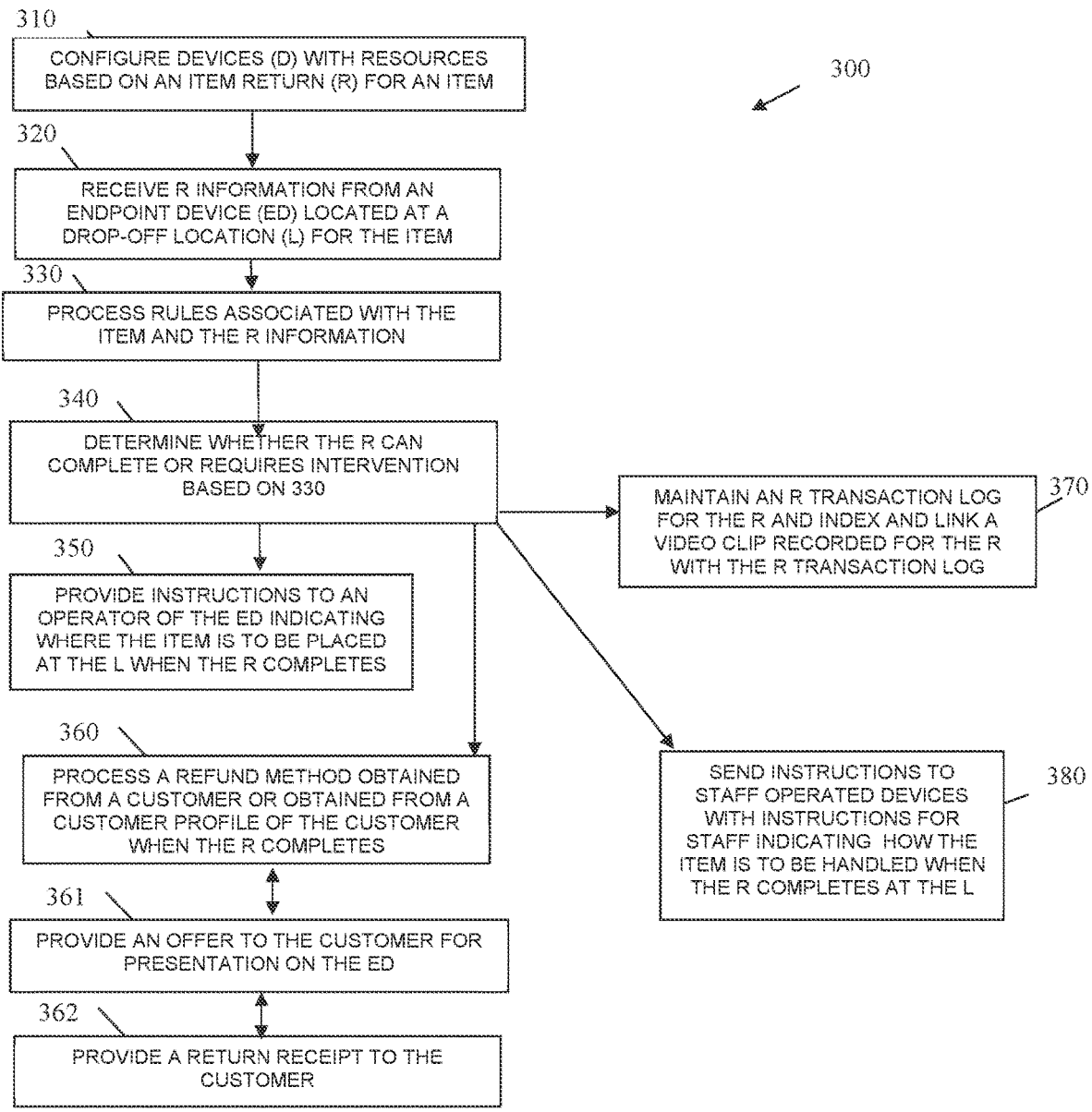
FIG. 3 is a diagram of another method for processing an item return within an item return architecture, according to an example embodiment.

FIG. 3 is a diagram of another method 300 for processing an item return within an item return architecture, according to an example embodiment. The software module(s) that implements the method 300 is referred to as an "item return security workflow manager." The item return security workflow manager is implemented as executable instructions programmed and residing within memory and/or a non-transitory computer-readable (processor-readable) storage medium and executed by one or more processors of one or more devices. The processors that execute the item return security workflow manager are specifically configured and programmed to item return security workflow manager. The item return security workflow manager may have access to one or more network connections during its processing. The network connections can be wired, wireless, or a combination of wired and wireless.

In an embodiment, the device that executes the item return security workflow manager is server 110. In an embodiment, server 110 is a cloud-based server comprised of a plurality of servers logically cooperating and accessible as a single server 110, a local-area network (LAN)-based server, or a wide-area network (WAN) server.

In an embodiment, multiple devices execute different portions of item return security workflow manager. For example, some portions of the item return security workflow manager execute on a cloud 110 while other portions of the item return security workflow manager execute on one or more WAN or LAN servers 110. As another example, some portions of item return security workflow manager execute on retailer devices 130, others on consumer devices 120, while still others on cloud 110 and/or server 110.

In an embodiment, the item return security workflow manager is all of or some combination of person tracker 124, object tracker 125, behavior-action tracker 126, compliance monitor 127, remediation manager, and/or the method 300.

The item return security workflow manager presents another and, in some ways, enhanced processing perspective of the method 200 discussed above.

At 310, the item return security workflow manager configured devices with resources based on an item return for an item.

At 320, the item return security workflow manager receives return information from an endpoint device (120 or 130), which is located at a drop-off location for the item.

At 330, the item return security workflow manager processes rules defined within a workflow for the item return and associated with the item.

At 340, the item return security workflow manager determines whether the item return can complete or whether the item return requires intervention based on processing of the rules at 330 for the workflow.

In an embodiment, at 350, the item return security workflow manager provides instructions to an operator (customer during self-item return or staff member during assisted item return) indicating where the item is to be placed at the drop-off location when the item return completes.

In an embodiment, at 360, the item return security workflow manager processes a refund method obtained from a customer associated with the item return or obtained from a customer profile of the customer when the item return completes.

In an embodiment of 360 and at 361, the item return security workflow manager provides an offer to the customer for presentation on the endpoint device.

In an embodiment of 361 and at 362, the item return security workflow manager provides a return receipt to the customer.

In an embodiment, at 370, the item return security workflow manager maintains an item return transaction log for the item return and indexes and links a video clip recorded for the item return with the item return transaction log.

In an embodiment, at 380, the item return security workflow manager sends instructions to staff operated devices for staff indicating how the item is to be handled when the item return completes at the drop-off location.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising: obtaining by a processor executable instructions from a non-transitory computer-readable storage medium causing the processor to perform operations, comprising: determining a workflow for an item return of an item based on first factors, wherein the first factors comprising an item type for the item, an item category for the item, an item brand for the item, and a customer transaction history for a customer returning the item; and processing the workflow; wherein processing the workflow further comprises: detecting a presence of the item at a drop-off location for the item return; collecting return information for the item; performing a security check based on second factors using at least a portion of the return information, wherein the second factors comprise: 1) a likelihood of fraud based on metrics gathered from the customer transaction history and other customers' transaction histories associated with a given geographical location of the item return, and 2) a second likelihood of fraud based on a calculated weight based time of day, a calculated weight based day of week, a calculated weight based calendar date using the customer transaction history and the other customer's transaction histories associated with the given geographical location; and raising an item return exception causing interruption of the workflow based on the performing of the security check.

2. The method of claim 1, wherein determining further includes receiving an item return request from a customer through a customer-operated device.

3. The method of claim 2, wherein receiving further includes identifying an item type, an item category within the item type, an item brand within the item category, a drop-off store associated with the drop-off location, and a customer identifier from the item return request and resolving the first factors.

4. The method of claim 3, wherein processing further includes obtaining the workflow as a collection of statements, each statement representing a customized rule defined by a retailer that is associated with the item return and dynamically evaluating each customized rule.

5. The method of claim 1, wherein detecting further includes receiving location information reported by a customer-operated device for a customer associated with the item return and determining that the location information is within a geofenced area of the drop-off location.

6. The method of claim 1, wherein detecting further includes receiving an application-reported message from a customer-operated device for a customer associated with the item return when an application of the customer-operated device detects a wireless beacon signal from a wireless beacon located within a geofenced area of the drop-off location.

7. The method of claim 1, wherein detecting further includes receiving card information from a transaction terminal located at the drop-off location and linking the card information to a card of a customer associated with the item return.

8. The method of claim 1, wherein detecting further includes identifying a face of a customer associated with the item return from images captured by cameras located in the drop-off location.

9. The method of claim 1, wherein collecting further includes obtaining a first portion of the return information as input provided by an operator of an endpoint device and obtaining a second portion of the return information as an image of the item captured by a camera associated with the endpoint device.

10. The method of claim 9, wherein performing further includes analyzing the image and determining whether the item is damaged or a counterfeit.

11. The method of claim 1, wherein raising further includes sending a notification to a device operated by an authorized individual to inspect the item and return information requiring an override from the authorized individual to complete the item return.

12. A system, comprising: a server comprising a server processor and a sever non-transitory computer-readable storage medium; an endpoint device comprising an endpoint device processor and an endpoint device non-transitory computer-readable storage medium; the server non-transitory computer-readable storage medium comprising a first set of executable instructions; the endpoint device non-transitory computer-readable storage medium comprising a second set of executable instructions; the first set of executable instructions when executed on the server processor from the server non-transitory computer-readable storage medium causing the server processor to perform first operations comprising: obtaining a workflow for an item return of an item based on first factors wherein the first factors comprising an item type for the item, an item category for the item, an item brand for the item, and a customer transaction history for a customer returning the item; processing the workflow; wherein processing the workflow further comprises: detecting a presence of the item at a drop-off location for the item return; collecting return information for the item from the endpoint device; performing a security check based on second factors using at least a porting of the return information, wherein the second factors comprise: 1) a likelihood of fraud based on metrics gathered from the customer transaction history and other customers' transaction histories associated with a given geographical location of the item return, and 2) a second likelihood of fraud based on a calculated weight based time of day, a calculated weight based day of week, a calculated weight based calendar date using the customer transaction history and the other customer's transaction histories associated with the given geographical location; and raising an item return exception causing interruption in with workflow based on the security check; the second set of executable instructions when executed on the endpoint device processor from the endpoint device non-transitory computer-readable storage medium causing the endpoint device processor to perform second operations comprising: collecting a first portion of the return information from an operator of the endpoint device; collecting a second portion of the return information from one or more of a cameras, a card reader, and a weigh scale of the endpoint device; providing the first portion and the second portion to the server as the return information; and suspending the item return when the item return exception is detected from the server.

13. The system of claim 12, wherein the endpoint device is a mobile device operated by a customer associated with the item return, a Self-Service Terminal (SST) operated by the customer at the drop-off location, a Point-Of-Sale (POS) terminal operated by a staff member at the drop-off location, or a mobile device operated by the staff member at the drop-off location.

* * * * *

UNITED STATES PATENT AND TRADEMARK OFFICE
CERTIFICATE OF CORRECTION

PATENT NO. : 11,475,397 B2
APPLICATION NO. : 17/151914
DATED : October 18, 2022
INVENTOR(S) : Burris et al.

It is certified that error appears in the above-identified patent and that said Letters Patent is hereby corrected as shown below:

In the Claims

In Column 12, Line 20, in Claim 1, after "comprising:", insert a linebreak

In Column 12, Line 23, in Claim 1, after "comprising:", insert a linebreak

In Column 12, Line 27, in Claim 1, after "and", insert a linebreak

In Column 12, Line 28, in Claim 1, after "workflow;", insert a linebreak

In Column 12, Line 29, in Claim 1, after "comprises:", insert a linebreak

In Column 12, Line 30, in Claim 1, after "return;", insert a linebreak

In Column 12, Line 31, in Claim 1, after "item;", insert a linebreak

In Column 12, Line 38, in Claim 1, after "based", insert --on--

In Column 12, Line 39 (First Occurrence), in Claim 1, after "based", insert --on--

In Column 12, Line 39 (Second Occurrence), in Claim 1, after "based", insert --on--

In Column 12, Line 42, in Claim 1, after "and", insert a linebreak

In Column 13, Line 27, in Claim 12, after "comprising:", insert a linebreak

In Column 13, Line 29, in Claim 12, after "medium;", insert a linebreak

In Column 13, Line 31, in Claim 12, after "medium;", insert a linebreak

Signed and Sealed this
Fifteenth Day of April, 2025

Coke Morgan Stewart
*Acting Director of the United States Patent and Trademark Office*

CERTIFICATE OF CORRECTION (continued)
U.S. Pat. No. 11,475,397 B2

In Column 13, Line 33, in Claim 12, after "instructions;", insert a linebreak

In Column 13, Line 35, in Claim 12, after "instructions;", insert a linebreak

In Column 13, Line 39, in Claim 12, after "comprising:", insert a linebreak

In Column 14, Line 3, in Claim 12, after "item;", insert a linebreak

In Column 14, Line 4, in Claim 12, after "workflow;", insert a linebreak

In Column 14, Line 5, in Claim 12, after "comprises:", insert a linebreak

In Column 14, Line 6, in Claim 12, after "return;", insert a linebreak

In Column 14, Line 7, in Claim 12, after "device;", insert a linebreak

In Column 14, Line 14, in Claim 12, after "based", insert --on--

In Column 14, Line 15, in Claim 12, after "based", insert --on--

In Column 14, Line 16, in Claim 12, after "based", insert --on--

In Column 14, Line 18, in Claim 12, after "and", insert a linebreak

In Column 14, Line 20, in Claim 12, after "check;", insert a linebreak

In Column 14, Line 24, in Claim 12, after "comprising:", insert a linebreak

In Column 14, Line 26, in Claim 12, after "device;", insert a linebreak

In Column 14, Line 28, in Claim 12, after "device;", insert a linebreak

In Column 14, Line 30, in Claim 12, after "and", insert a linebreak